United States Patent

[11] 3,543,893

| [72] | Inventors | Donald R. Ross;<br>Donald R. Ross, Jr., Pittsburgh,<br>Pennsylvania |
|---|---|---|
| [21] | Appl. No. | 768,127 |
| [22] | Filed | Oct. 16, 1968 |
| [45] | Patented | Dec. 1, 1970 |
| [73] | Assignee | U.S. Electric Manufacturing Company<br>Pittsburgh, Pennsylvania<br>a partnership |

[54] TROLLEY CONDUCTOR TENSION DEVICE
2 Claims, 6 Drawing Figs.
[52] U.S. Cl. .................................................. 191/40
[51] Int. Cl. .................................................. B60m 1/24
[50] Field of Search .......................................... 191/40, 42,
43, 44, 44.1; 104/111; 249/63, 226.4, 316.4

[56] References Cited
UNITED STATES PATENTS

| 2,479,352 | 8/1949 | Hanna | 191/44.1 |
| 2,548,986 | 4/1951 | Mayer | 191/40X |
| 2,824,913 | 2/1958 | Tayler | 191/43 |

Primary Examiner—Arthur L. LaPoint
Assistant Examiner—George H. Libman
Attorney—Brown, Murray, Flick and Peckham ABSTRACT: An anchor block is rigidly mounted on one end of a straight length of trolley conductor which is anchored at its opposite end. A supporting hanger is clamped onto the conductor and provided with a central recess containing the block. Means is provided for rigidly connecting the hanger to a fixed support with one end wall of its recess pressed against the adjoining end of the anchor block to hold the conductor under tension.

Patented Dec. 1, 1970

3,543,893

INVENTORS.
DONALD R. ROSS
DONALD R. ROSS, JR.

BY Brown, Critchlow, Flick & Peckham
ATTORNEYS.

INVENTORS.
DONALD R. ROSS, SR.
DONALD R. ROSS, JR.

TROLLEY CONDUCTOR TENSION DEVICE

Straight lengths of trolley conductor, such as used for supplying electrical energy to travelling cranes, should be stretched tightly so that they do not deflect when the trolley shoes slide along them. In many cases tensioning of the conductors is simply a matter of applying clamps to their ends and fastening the clamps to rigid supports, but in such cases the trolley shoes are limited to travel between the clamps. Conventional end clamps cannot be used when the conductor must extend past the clamps so that a shoe can move past them. For example, in some instances an endless conductor has straight lengths connected by curved sections, thereby forming a closed loop around which a trolley shoe travels. If the straight lengths are not held under tension by independent means, they may pull the curved sections out of shape. On the other hand, conventional end clamps cannot be applied to the ends of the straight lengths, as that would prevent the shoe from passing the clamps. In another type of installation it is desirable to support a conductor in such a way that a trolley shoe can leave one or both ends of the conductor and engage another conductor alined with it. In such a case, conventional clamps at the ends of the conductor would prevent the shoe from leaving it.

It is an object of this invention to provide a device by which a trolley conductor can be held under tension without interfering with movement of the trolley shoe. Another object is to provide a device which is formed in part by a hanger that supports the conductor.

The invention is illustrated in the accompanying drawings, in which.

Figure 1:
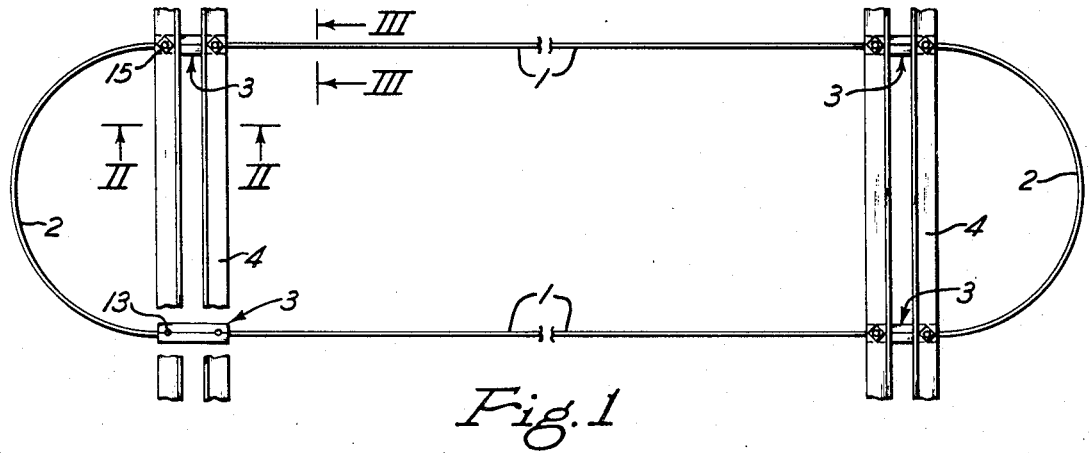
FIG. 1 is a plan view of an endless conductor forming a loop.
Figure 4:
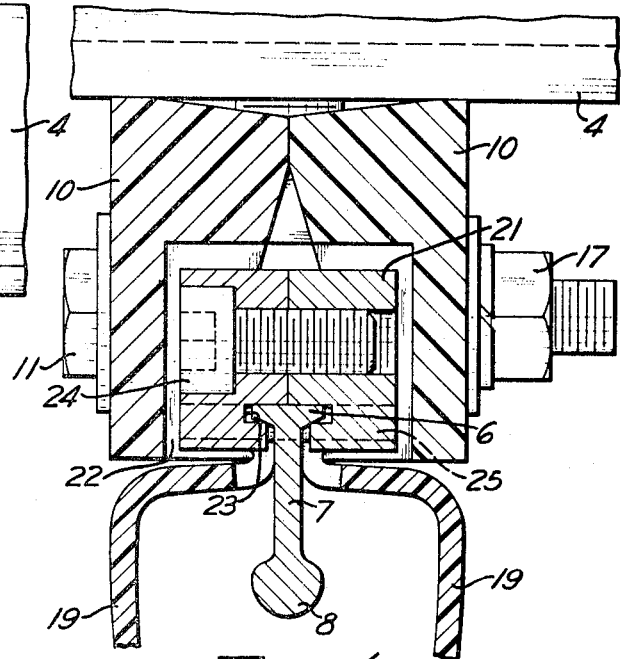
FIG. 4 is a further enlarged fragmentary vertical section taken on the line IV–IV of FIG. 2.

Referring to FIG. 1 of the drawings, a continuous trolley conductor has two straight parallel lengths 1 integrally connected by curved ends 2. The conductor is supported by hangers 3 at the opposite ends of the straight lengths, and by as many intermediate hangers (not shown) as required. The hangers are rigidly connected to suitable stationary supporting members, such as angle bars 4. The conductor itself is a metal strip or bar formed from copper or other suitable electrical conducting material. As shown in FIG. 4, for example, the conductor has a head 6 extending along the top of a thin vertical web 7 that integrally connects the head with a bulbous lower portion 8, along which a trolley shoe (not shown) slides. The head projects laterally a short distance from the opposite sides of the web.

Figure 2:
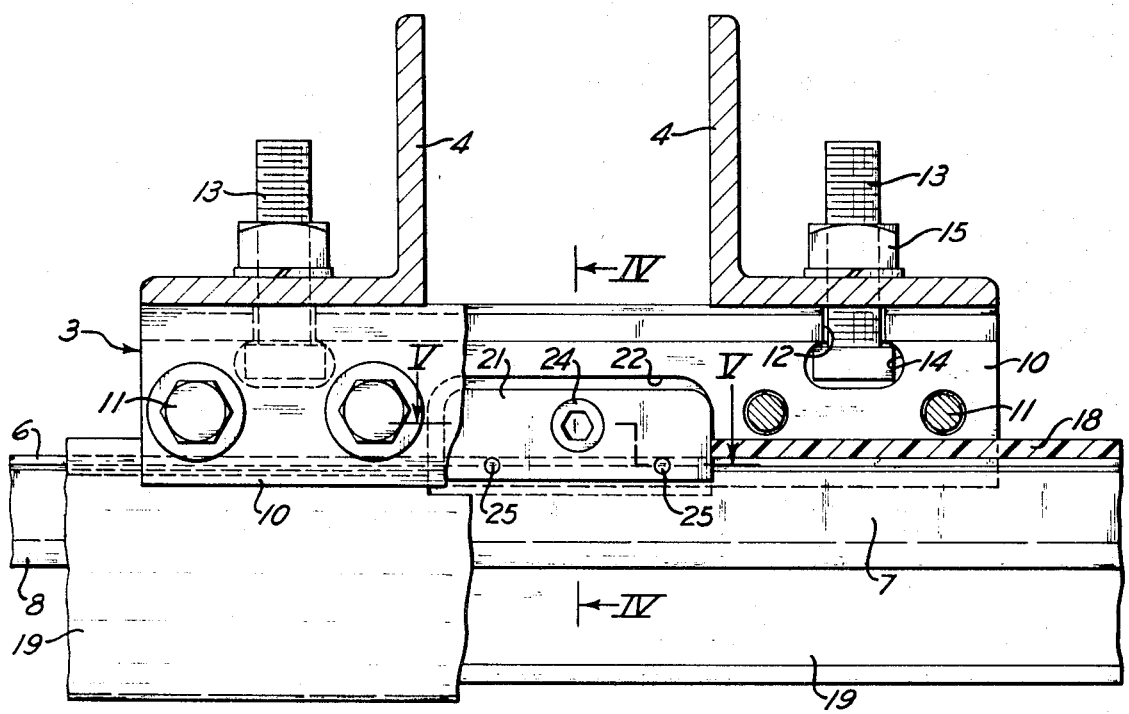
FIG. 2 is an enlarged view taken on the line II–II of FIG. 1, partly broken away.
Figure 3:
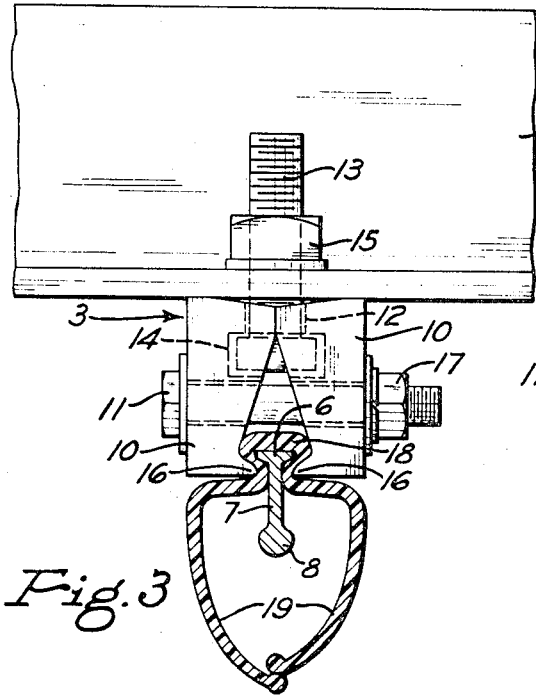
FIG. 3 is an enlarged section taken on the line III–III of FIG. 1.

As shown in FIGS. 2 and 3, each hanger 3 has two barlike jaws 10 disposed side by side with bolts 11 extending through them to connect them. The inner upper edges of the jaws are close together and are provided with recesses 12 to accommodate vertical bolts 13 that have heads at their lower ends disposed in sockets 14 formed in the jaws below the recesses. These bolts extend up through the overlying bars 4 and are provided with nuts 15 for attaching the hanger securely to the bars. The inner faces of the jaws at the opposite ends of the hanger diverge downwardly and then curve inwardly toward each other to form lips 16 that are spaced apart far enough to receive the upper part of the conductor between them. By tightening nuts 17 on the bolts that pass through the jaws, the conductor can be clamped tightly between the jaws to support it. Although the jaws could engage the conductor directly, it is highly desirable to shield the metal conductor by means of a flexible guard of known construction. Such a guard is a plastic tubular member that surrounds the conductor and has a head 18 and downwardly extending flexible sidewalls 19, the lower edges of which normally overlap. The head of the guard fits over the head of the conductor and is clamped tightly against it by the hanger.

Figure 5:
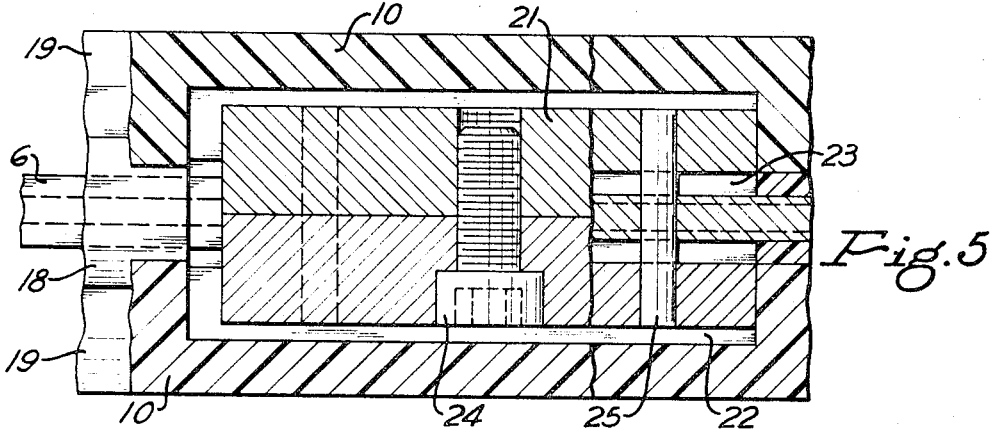
FIG. 5 is an enlarged fragmentary horizontal section taken on the line V–V of FIG. 2.

Although the hangers will support the trolley conductor, they generally cannot hold it tightly enough to keep it under tension so that it will not deflect when a trolley shoe slides along it. a In other words, the conductor may slip lengthwise in the hangers and thereby shorten and flatten end loops 2. Therefore, to hold the conductor under tension, an anchor block 21 is rigidly mounted on the head of the conductor inside each hanger, as shown in FIGS. 2, 4 and 5. To permit this, the central portion of each hanger is provided with an open-bottom recess 22 that accommodates the block. The upper part of the plastic shield around the metal conductor is notched out to receive the lower part of the block. The lower portion of the block is provided with a downwardly opening slot 23 extending through it from end to end for receiving the head of the conductor. The conductor is anchored in this slot. The best way of doing this is to make the block in two halves that are disposed side by side. The slot in the block is cut in each half of the block. The two halves are applied to opposite sides of the conductor and then they are clamped together by a screw 24 rotatably mounted in one half and threaded in the other half. One of more anchor pins 25 extend transversely through the block and through holes drilled in the conductor. Two of these pins are shown. The anchor block and the hanger housing form a tension device that prevents slippage of the conductor lengthwise.

When one of these tension devices has been secured to one end of a straight length 1 of the conductor and attached to angle bars 4 above it, that end is anchored. Then suitable well-known means for stretching the straight conductor length taut is clamped onto the other end of that length behind the point where the other tension device is to be applied. The stretching means also is connected to a suitable stationary member ahead of it so that the conductor can be stretched forward in a direction away from its anchored end to tension it. The anchor block at the anchored end will be pulled against one end of the hanger recess in which it is disposed. Then two holes are drilled in the conductor directly beneath its head at the point where the second anchor block 21 is to be attached. The anchor pins 25 are inserted in the holes and in the two halves of the block, which are then screwed together. The anchor block then is inserted in the recess 22 in the second hanger and the jaws of the hanger are clamped onto the conductor at the opposite ends of the block. During this operation the rear end of the hanger recess, which is the end of the recess that is closer to the far end of the straight conductor length, is held against the adjacent end of the anchor block. After the hanger has been applied to the conductor as just described, the hanger is secured to its supporting bars 4. Then the stretching means is removed from the conductor, but the straight conductor length between the two tension devices will not lose its tension because the rear ends of the hanger recesses will prevent the anchor blocks therein from moving toward each other. Since the straight lengths of the conductor cannot move, the end loops 2 will not be pulled out of shape.

Figure 6:
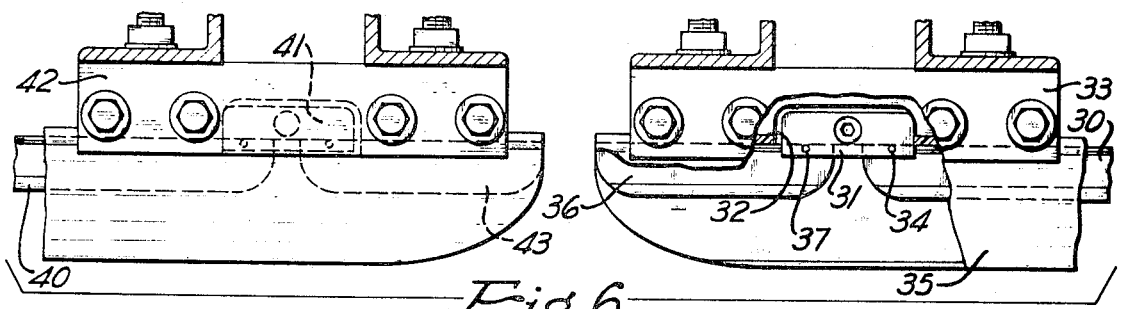
FIG. 6 is a side view of a modification, partly broken away in section.

In another application of the tension device it is applied to the end of the conductor carried by the bridge of a travelling crane and which is intended to be alined at times with a like conductor on another crane at one end of the bridge so that a carriage on the bridge can travel from one crane to another. In this application, illustrated in FIG. 6, the metal conductor 30 terminates about one-half way through an anchor block 31 in the recess 32 of a hanger 33, and only one anchor pin 34 extends through the conductor. Also, only the rear end of the hanger is clamped onto the conductor through the guard 35 surrounding it. The anchor block engages the rear end of the hanger recess. The other end of the hanger is clamped onto a short strip 36 of insulating material that has the same cross-sectional shape as the conductor. One end of this strip extends into the slot in the anchor block and is held there by a single pin 37, and the other end of the strip projects only a short distance from the front end of the hanger and may likewise be enclosed by the flexible guard. The insulating strip insulates the conductor behind it from the conductor 40 of the next crane, but allows a contact shoe to travel from one conductor to the other. Conductor 40 likewise is held under tension by an anchor block 41 in a hanger 42 that also clamps onto an insulating strip 43 spaced a short distance from insulating strip 36 when the two strips are aligned.

We claim:

1. The combination with a straight length of trolley conductor anchored at one end and having a laterally projecting head extending along its top, of a tension device comprising an anchor block formed from two halves disposed side by side and provided in its bottom with an open-bottom slot extending from end to end thereof and shaped to receive the head of the conductor at the end of the straight length opposite the anchored end, a screw extending through said block halves and holding them together, an anchor pin mounted in said block halves and extending through a hole in the conductor to connect the block to the conductor, a supporting hanger clamped onto the head of the conductor and provided with a central open-bottom recess containing the block and having a rear end wall closer than its opposite end wall to said anchored end, and means for rigidly connecting the hanger to a fixed support with said rear end wall of the recess pressed against the adjoining end of the anchor block to hold said conductor length under tension.

2. The combination recited in claim 1, in which said conductor terminates part way through the anchor block and the hanger is clamped onto the conductor only behind the block, said device including an insulating strip similar in shape to said conductor and having a head clamped in the hanger in front of the block and extending into the block slot, and a second anchor pin mounted in said block halves and extending through a hole in said insulating strip.